Oct. 31, 1933.         G. WALTHER         1,933,036
METAL WHEEL
Filed Dec. 18, 1929
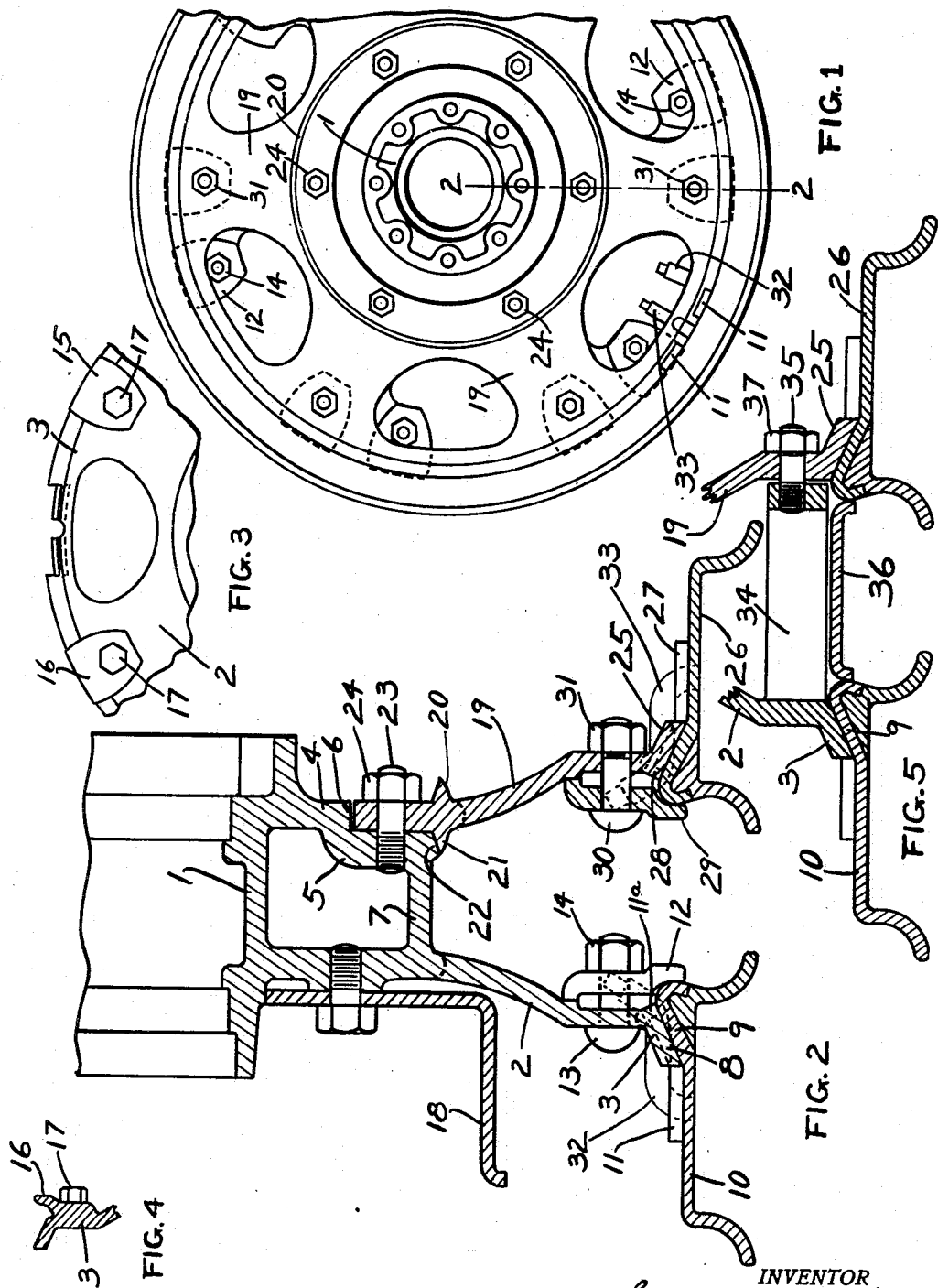

Patented Oct. 31, 1933

UNITED STATES PATENT OFFICE 1,933,036

METAL WHEEL

George Walther, near Dayton, Ohio, assignor to The Dayton Steel Foundry Company, Dayton, Ohio, a corporation of Ohio Application December 18, 1929
Serial No. 415,001

1 Claim. (Cl. 301—9)

This invention relates to new and useful improvements in metal wheels.

It is one of the principal objects of my invention to provide a simple, durable and efficient dual metal wheel that may be easily converted into a single one by removing either the inner or the outer wheel.

The front wheel can be easily demounted near the hub to leave the back wheel as the single one, or, if desired, the back wheel may be removed and the front one used as a single wheel by taking it off, turning it around with relation to the hub and then re-applying it. When put back on in its reverse position, the tread line will be in a more central relation to the bearing.

It is another object of my invention to provide for each wheel of the dual structure, a driver which will also act as an aliner for the tire rim.

When but a single wheel is used, it is a further object of the invention to make some of the clamps integral with the felloe to act as means over which the rim may be hooked for alinement within practical tolerances.

Other important and incidental objects will be brought out in the following specification and particularly set forth in the subjoined claim.

In the accompanying drawing illustrating my invention, Figure 1 is a front elevational view of my convertible metal wheel. Figure 2 is a radial sectional view taken through said wheel when used in its dual capacity. Figure 3 is a front view of a portion of the wheel felloe, showing the integral alining clamps. Figure 4 is a sectional view taken through the integral clamp portion of the wheel. And Figure 5 is a sectional view taken through a modified form of construction in which axial ribs are formed on the inner spoke section to receive means for securing the outer reversible spoke section to them.

Referring to the accompanying drawing for a detailed description of my invention, the numeral 1 designates the hub of a wheel preferably constructed of steel. The hub is formed with a back radial extension containing holes to form a spoke section 2 that terminates in a felloe portion 3. There is also on the hub a short front radial extension 4 having an inset part 5 that forms a shoulder 6 and is joined to the inner spoke section 2 by ribs 7.

Formed on the felloe 3 of the spoke section 2 is a beveled seat portion 8 for the inner tapered end 9 of a tire rim 10.

Secured to the tapered, and a part of the straight, inner surface of the tire rim 10 is a driving member 11 which is adapted to fit in a recess formed in the beveled seat 8 on the felloe. In applying the tire rim to the felloe, it is raised a sufficient distance above the seat 8 to enable the driving member 11 to enter the recess in the seat. Then, when it is in its home position within the recess, the driver will aline the rim within all practical tolerances, since there is formed at the inner end of the recess a shoulder 11ª which is adapted to be engaged by the inner end of the driver. The member 11 therefore acts not only as a driver but also as an aliner. (See Figure 1.)

After the inner rim 10 is in place on the seat 8, clamps 12, secured to the spoke section 2 by bolts 13, are brought into firm engagement with the inner face of the rim by tightening the nuts 14.

Instead of employing the driver 11 as the alining means, one or more of the clamps may be employed for that purpose by making them integral with the felloe. In this event the tire rim is first hooked over the integral clamp or clamps, which aline it within practical tolerances. In Figures 3 and 4, I have shown a portion of the felloe provided with two integral clamps 15 and 16 with nuts 17 cast on the clamps for the purpose of improving the appearance of the wheel.

A brake drum 18 is secured to the inner extended portion of the wheel, near its hub 1.

Adapted to be secured to the inset portion 5 of the radial extended portion 4 of the hub 1, is a spoke section 19. Formed on the latter are two oppositely disposed beveled projections 20 and 21. Either one of the latter are adapted to rest against a beveled seat 22 formed at the outer edge of the inset portion 5 of the hub extension 4. The spoke section 19 is firmly secured against the outer face of said inset portion by studs 23 and nuts 24.

Formed on the outer felloe part of the spoke section 19 is a beveled seat 25 for the tapered inner end of a tire rim 26. Secured to the latter is a driving member 27, similar to the driving member 11, and which fits in a recess in the beveled seat 25. At the inner end of this recess there is a shoulder 28 which is engaged by the member 27, whereby the latter acts as an aliner as well as a driver for the rim.

Clamps 29 carried by bolts 30 passing through the outer portion of the spoke section 19, are drawn into firm engagement with the inner part of the tire rim by nuts 31 on the outer ends of said bolts.

The valve 32 for the tire on the inner rim 10, and the valve 33 for the tire on the outer rim 26, are easily accessible through one of the holes in the outer spoke section 19, as shown in Figure 1.

The attachment of the spoke section 19 of the outer wheel to the inset portion 5 of the hub extension 4, by means of the studs 23 and nuts 24, enables this wheel to be easily demounted near the hub so that the inner wheel may be used.

If, on the other hand, it is desired to employ the front wheel as the single one, the rear tire rim is removed and the front spoke section 19 turned around and re-applied to the inset portion 5 of the hub extension 4 by the studs 23 and nuts 24. When this is done, the beveled projection 20 on the spoke section will engage the tapered seat 22 on the inset part of the hub extension. Since the spoke section 19 curves outwardly when used in the dual assembly, it will curve inwardly when turned around to bring the tread line of the wheel of which it is a part substantially central with the bearing when said wheel is employed as a single one. If used in the latter capacity, the bolts 30 and nuts 31 may be reversed to bring the latter on the outside.

In Figure 5, I have shown my dual wheel constructed with axial ribs 34 formed on the inner spoke section 2. The outer ends of these ribs contain tapped holes to receive studs 35 which pass through the outer bolt holes in the outer spoke section 19. A spacer ring 36 surrounds these ribs for engagement by the gutter on the outer tire rim. The latter is first hung on the outer edge portions of the ribs, after which the spoke section 19 is applied to them by tightening nuts 37 on the studs 35. In this form of construction of my dual wheel I use the reversible spoke section 19 in connection with a spacer between the tire rims.

From the above description it will be apparent that my improved metal wheel may be easily converted from a dual to a single one, with the choice given to use either the outer or the inner wheel for that purpose. The alining of the tire rims is also made possible within practical tolerances by the use of the drivers or the integral clamps.

Having described my invention, I claim:

In a metal wheel, a hub and two spaced radial extensions thereon, a tire rim applied to the inner hub extension, the outer hub extension formed with an inset portion having a beveled seat at its outer edge, a tire-rim carrying section, a tapered projection on each side of the latter for engagement with the beveled seat, and means for applying said section to the inset portion of the outer hub extension, with one or the other of said projections resting against said seat, the said section being so constructed that it may serve in one position as a wheel of a dual assembly or may be turned around for use as a single wheel when the inner tire rim is removed, with the tread line in approximately a central relation to the bearing.

GEORGE WALTHER.